(12) United States Patent
Nagai

(10) Patent No.: US 7,439,643 B2
(45) Date of Patent: Oct. 21, 2008

(54) MOTOR HAVING SUCTION RING

(75) Inventor: Kazuyoshi Nagai, Kanagawa-ku (JP)

(73) Assignee: Victor Company of Japan, Limited, Yokohama (JP)

( * ) Notice: Subject to any disclaimer, the term of this patent is extended or adjusted under 35 U.S.C. 154(b) by 88 days.

(21) Appl. No.: 11/425,195

(22) Filed: Jun. 20, 2006

(65) Prior Publication Data

US 2007/0001531 A1    Jan. 4, 2007

(30) Foreign Application Priority Data

Jun. 30, 2005    (JP)    ............ 2005-191317

(51) Int. Cl.
*H02K 21/12* (2006.01)
(52) U.S. Cl. ............... 310/156.4; 310/67 R
(58) Field of Classification Search ............ 310/156.04, 310/98.07, 67 R
See application file for complete search history.

(56) References Cited

U.S. PATENT DOCUMENTS 7,030,527 B2 * 4/2006 Tsuda et al. ............ 310/90
7,201,517 B2 * 4/2007 Gomyo et al. ............ 384/107
2005/0058374 A1 * 3/2005 Gomyo et al. ............ 384/119
2005/0135003 A1 * 6/2005 Inoue et al. ............ 360/99.08

FOREIGN PATENT DOCUMENTS

| JP | 11032460 A | * | 2/1999 |
| JP | 2003-061305 A | | 2/2003 |
| JP | 2003259596 A | * | 9/2003 |

* cited by examiner

*Primary Examiner*—Thanh Lam
(74) *Attorney, Agent, or Firm*—Connolly Bove Lodge & Hutz LLP (57) ABSTRACT

A suction ring is fixed to a motor base and is provided with an outer circumferential section having a first outer diameter that is smaller than an inner diameter of a wall section of the motor base. A plurality of protruded sections each have a second outer diameter larger than the inner diameter of the wall section of the motor base and protrudes outward in a radial direction from the outer circumferential section of the suction ring. The plurality of protruded sections of the suction ring are press fitted into a wall section of the motor base and secures the suction ring to the motor base. One surface of the suction ring coincides with a bottom surface of the ring magnet covering a whole range of a projected area of the ring magnet that is projected onto the surface of the suction ring.

2 Claims, 4 Drawing Sheets

MOTOR HAVING SUCTION RING

BACKGROUND OF THE INVENTION

1. Field of the Invention

The present invention relates to a motor having a suction ring, particularly, relates to a motor having a suction ring suitable for driving a hard disc drive and a laser beam printer.

2. Description of the Related Art

Figure 5:
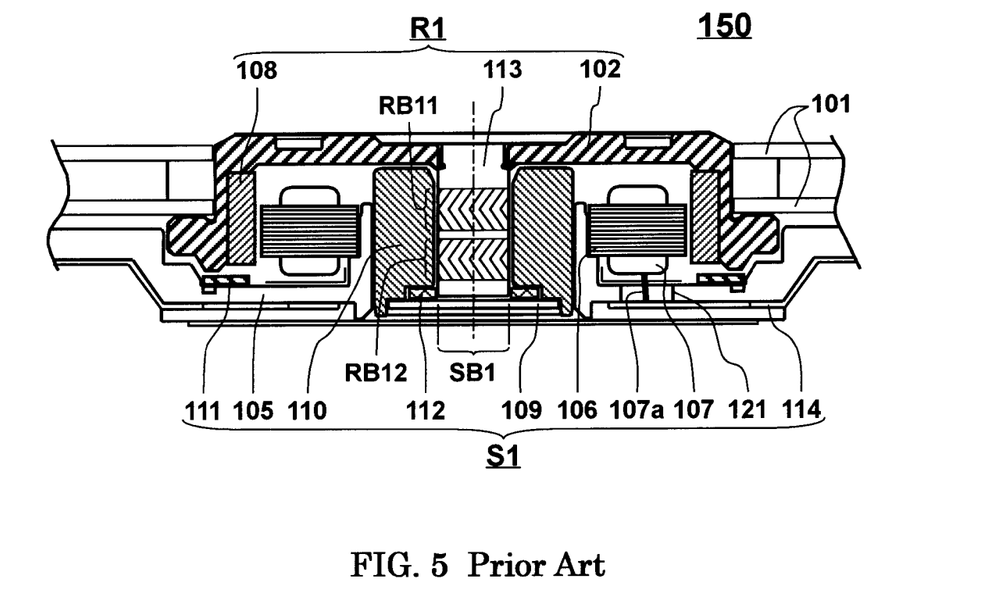
FIG. 5 is a cross sectional view of a motor according to the prior art.

A motor for driving a hard disc drive (hereinafter referred to as HDD) according to the prior art is shown in FIG. 5.

Figure 6:
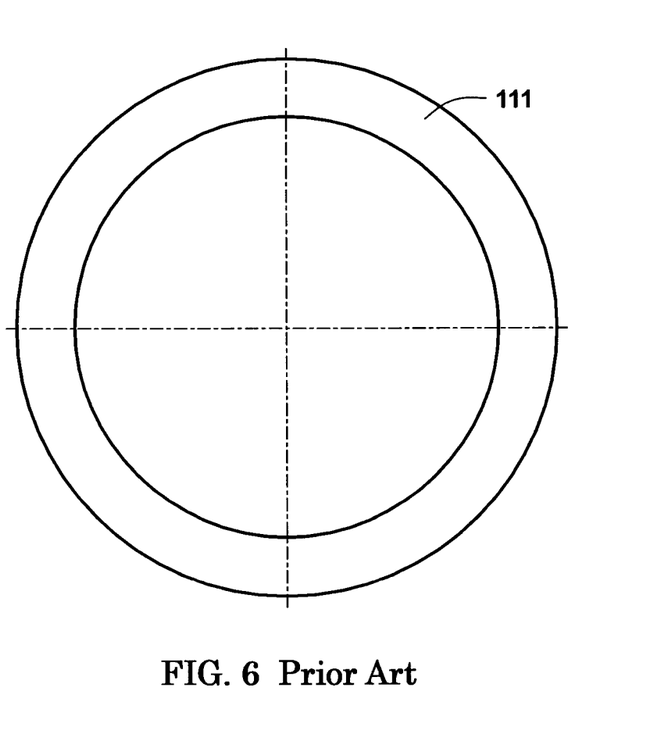
FIG. 6 is a plan view of a suction ring used in the motor shown in FIG. 5.

FIG. 5 is a cross sectional view of a motor according to the prior art, and FIG. 6 is a plan view of a suction ring to be used in the motor shown in FIG. 5.

In FIG. 5, a motor 150 is driven by three-phase current and mounted with at least one hard disc (HD) 101 thereon.

Further, the motor 150 is essentially composed of a stator S1 and a rotor R1.

The stator S1 is further composed of a core 106, a coil 107, a counter plate 109, a sleeve 110 and a motor base 105. The motor base 105 is formed by a process of pressing an aluminum plate or an aluminum die-casting process.

The sleeve 110 is in a cylindrical shape and fixed on a circumferential wall surface of a hole formed vertically in the center of the motor base 105 by a binding agent or a press fitting process.

Further, an inner circumferential section of the sleeve 110 is made from a sintered metal material or a plated copper alloy material.

Furthermore, one end portion of the sleeve 110 is formed with a stepped section for containing a thrust ring 112 to be detailed and the end portion is sealed by the counter plate 109.

As mentioned above, the motor 150 is driven by the three-phase current, so that the core 106 is provided with nine protrusions equivalent to magnetic poles and formed in approximately an annular shape.

More specifically, the core 106 is formed by laminating a plurality of silicon steel plates and a surface of the core 106 is treated by insulation coating through a process such as electropainting and powder coating.

Further, each protrusion of the core 106 is wound up by the coil 107.

Furthermore, a terminal 107a of a winding wire of the coil 107 is soldered on a flexible printed circuit board (hereinafter referred to as FPC) 114 mounted on a bottom of the motor base 105 by way of a through hole 121.

On the other hand, the rotor R1 is further composed of a hub 102, a shaft 113 and a magnet 108.

The hub 102 and the shaft 113 are made from a stainless steel material through a cutting process.

The magnet 108 is formed in a ring shape (hereinafter referred to as ring magnet 108) and made from an Nd—Fe—B system material. A surface of the ring magnet 108 is treated by an electropainting process.

Further, the shaft 113 is fixed to the hub 102 through a process of press fitting and then adhered.

Furthermore, the ring magnet 108 is fixed on an inner surface of an outer circumferential section of the hub 102 by a binding agent.

In addition thereto, the motor 150 is provided with a thrust dynamic pressure fluid bearing SB1 and radial dynamic pressure fluid bearings RB11 and RB12.

The thrust dynamic pressure fluid bearing SB1 is constituted by the thrust ring 112 in an annular shape that is fixed on a lower end portion of the shaft 113, the sleeve 110, the counter plate 109 and lubricating fluid (hereinafter referred to as lubricant) that is filled among each member.

The thrust ring 112 is made from a stainless steel material or a copper alloy. In case the thrust ring 112 is made from a copper alloy, surfaces of the thrust ring 112 are nickel-plated.

Under the above-mentioned configuration, the thrust dynamic pressure fluid bearing SB1 sustains the rotor R1 in the thrust direction by generating dynamic pressure in the thrust direction by means of dynamic pressure grooves formed on both the top and bottom surfaces of the thrust ring 112 while the rotor R1 is rotating.

On the other hand, the radial dynamic pressure fluid bearings RB11 and RB12 are constituted by an outer circumferential surface of the shaft 113, an inner circumferential surface of a through hole of the sleeve 110 into which the shaft 113 is inserted, and lubricant filled in a gap between them.

At least either one of the outer circumferential surface of the shaft 113 and the inner circumferential surface of the sleeve 110 is formed with radial dynamic pressure grooves such as herringbone for generating dynamic pressure. The dynamic pressure grooves generate dynamic pressure in the radial direction while the rotor R1 is rotating, and result in sustaining the rotor R1 in the radial direction. Two groups of radial dynamic pressure grooves are provided at two individual positions being apart from each other along the axis of rotation.

Further, the inner circumferential section of the sleeve 110 is made from a sintered material or a plated copper alloy material, as mentioned above, and provided with a recessed portion that is disposed between the two individual positions being formed with radial dynamic pressure grooves. In some cases, the sleeve 110 is divided into two components.

As mentioned above, the gap between the shaft 113 and the sleeve 110 and each gap among the thrust ring 112, the sleeve 110 and the counter plate 109 are filled with lubricant such as lubrication oil. The lubricant is circulated by the revolution of the rotor R1, and resulting in generating dynamic pressure. By the dynamic pressure, each dynamic pressure fluid bearing sustains the rotor R1 to be rotatable freely.

In the meantime, the motor 150 is installed with a suction ring 111 that is formed in a flat annular shape and disposed on the top surface of the motor base 105. A plan view of the suction ring 111 is shown in FIG. 6. Such a motor installed with a suction ring is disclosed in the Japanese publication of unexamined patent applications No. 2003-61305.

The suction ring 111 is made from iron that is a magnetic material and disposed under the ring magnet 108 so as to confront at least a part of the suction ring 111 with the bottom surface of the ring magnet 108.

Accordingly, the rotor R1 is magnetically absorbed toward the stator S1 side and restricted its movable distance in the axial direction.

Installing such a suction ring enables to ensure higher anti-vibration ability and higher impact resistant, which are particularly required for a motor to be installed in an HDD.

In case such a suction ring is adhered on a motor base by using a binding agent, the suction ring may rise or slant with respect to the motor base due to shrinkage of the binding agent when hardening.

If such rising of the suction ring occurs, uniform suction force is not ensured, and resulting in generating a problem of deteriorating noise level and vibration level of the motor.

Further, if the rising of the suction ring is excessively increased, the suction ring possibly contacts with a ring magnet and adds rotational load to the rotor, and resulting in generating another problem of increasing power consumption of the motor.

In this connection, it is commonly adopted as a method for installing a suction ring not to rise that an outer circumferential section of the suction ring is press fitted to an inner surface of a circular wall section provided for the motor base.

However, such a press fitting method creates further problems to be mentioned next, so that the method has been desired to be improved.

Generally, a binding agent is used for fixing several components together when assembling a motor. In order to harden the binding agent completely and to prevent so-called "outgas" phenomenon that is a phenomenon of generating gas from the hardened binding agent with time, a treatment of so-called burning is applied to a motor, wherein the treatment of burning is such as leaving a motor after assembled in a high temperature ambience of 130° C.

As mentioned above, the motor base is made from aluminum. A coefficient of linear expansion of the aluminum is $23.5 \times 10^{-6}/°C$. On the contrary, the suction ring is made from iron, and a coefficient of linear expansion of the iron is $12.1 \times 10^{-6}/°C$. As a matter of fact, each coefficient of linear expansion extremely differs from each other.

Accordingly, dimensional change in the radial direction caused by thermal expansion extremely reduces an overlap width for press fitting between the motor base and the suction ring, and resulting in generating a furthermore problem of rising the suction ring unless each overlap width of the suction ring and the motor base is designated to be more than a prescribed value.

As a specific example, with respect to a suction ring having a thickness of 0.4 mm, in case a diameter of an outer circumferential section of the suction ring to be press fitted into a motor base is designated to be 20 mm, an overlap width for press fitting disappears during the treatment of burning, and resulting in raising the suction ring unless the suction ring is press fitted into the motor base with being previously provided with an overlap width of 25 µm or more in diameter at the normal temperature (20° C.).

However, in order to actually press fit the above-mentioned members while maintaining the overlap width of 25 µm or more in diameter for press fitting, it is necessary for press fitting pressure to be more than 86 N. Enabling such a press fitting process of more than 86 N requires a relatively large-scale facility. In some cases, the motor base is deformed by such a high press fitting pressure, and resulting in deteriorating noise level and vibration level of a motor to be assembled.

Further, in case the suction ring is press fitted by such a high press fitting pressure, the suction ring disables to be accurately disposed in a prescribed position, and resulting in making a distance between the ring magnet and the suction ring uneven. Under such a circumstance, a movable distance in the axial direction of the rotor fluctuates, and resulting in generating a more problem of deteriorating noise level and vibration level of the motor.

In case the press fitting pressure is 20 N or less, the press fitting process enables to be performed by a regular facility.

In addition thereto, the pressure of 20 N or less is preferable because deformation of members other than the press fitted section never occurs or deformation is extremely slight if occurred.

SUMMARY OF THE INVENTION

Accordingly, in consideration of the above-mentioned problems of the prior arts, an object of the present invention is to provide a motor having a suction ring, which is less in noise and vibration and excellent in rotational characteristics although the suction ring, which confronts with a ring magnet and absorbs a rotor, is press fitted into a motor base.

In order to achieve the above object, the present invention provides, according to an aspect thereof, a motor comprising: a rotor having a hub and a ring magnet being fixed to the hub; and a stator having a motor base and a suction ring in an annular shape made from a magnetic material being fixed to the motor base, wherein the rotor is sustained rotatable freely with respect to the stator through a bearing composed of a sleeve and a shaft being inserted into the sleeve; wherein the suction ring is provided with a plurality of protruded sections that protrude in a radial direction on an outer circumferential section or an inner circumferential section of the suction ring; wherein the protruded sections of the suction ring are press fitted into a wall section that is provided on the motor base and resulting in fixing the suction ring to the motor base; and further wherein one surface of the suction ring is disposed so as to coincide with a bottom surface of the ring magnet with covering a whole range of a projected area of the ring magnet that is projected on the surface of the suction ring.

According to another aspect of the present invention, there provided a motor comprising: a rotor having a hub and a ring magnet being fixed to the hub; and a stator having a motor base and a suction ring in an annular shape made from a magnetic material being fixed to the motor base, wherein the rotor is sustained rotatable freely with respect to the stator through a bearing composed of a sleeve and a shaft being inserted into the sleeve; wherein the motor base is provided with a plurality of protruded sections that is formed on a surface of the motor base in a radial direction with rising toward the hub side; wherein an outer circumferential section or an inner circumferential section of the suction ring is press fitted into the plurality of protruded sections of the motor base and resulting in fixing the suction ring to the motor base; and further wherein one surface of the suction ring is disposed so as to coincide with a bottom surface of the ring magnet with covering a whole range of a projected area of the ring magnet that is projected on the surface of the suction ring.

Other object and further features of the present invention will be apparent from the following detailed description when read in conjunction with the accompanying drawings.

DETAILED DESCRIPTION OF THE PREFERRED EMBODIMENTS

First Embodiment

In reference to FIGS. 1-3, a motor having a suction ring according to a first embodiment of the present invention is detailed next.

Figure 1:
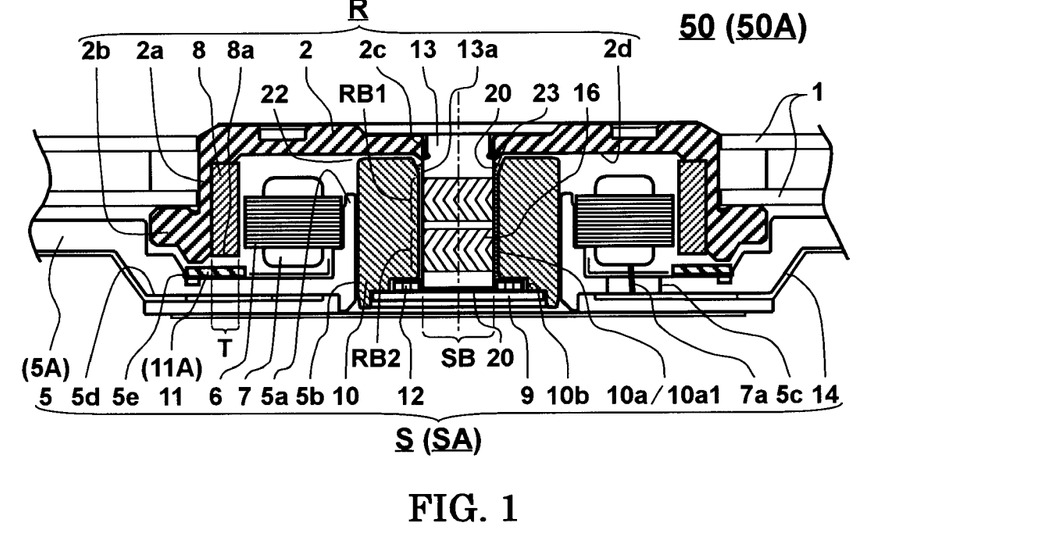
FIG. 1 is a cross sectional view of a motor having a suction ring common to first and second embodiments according to the present invention.

FIG. 1 is a cross sectional view of a motor having a suction ring common to first and second embodiments according to the present invention, wherein reference sings in parenthesis are exclusively for a second embodiment.

Figure 2:
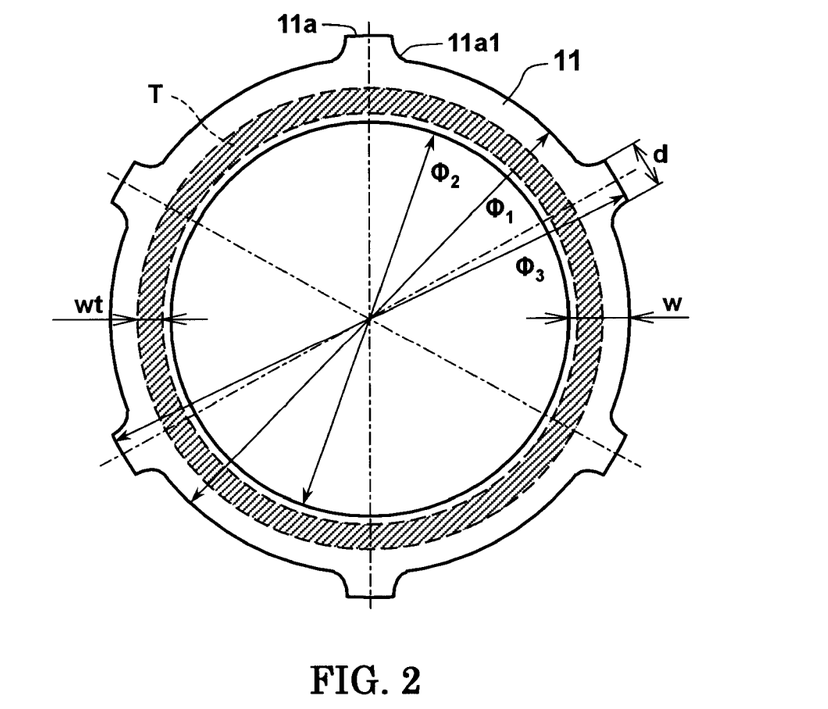
FIG. 2 is a plan view of a suction ring according to a first embodiment of the present invention.

FIG. 2 is a plan view of a suction ring according to a first embodiment of the present invention.

Figure 3:
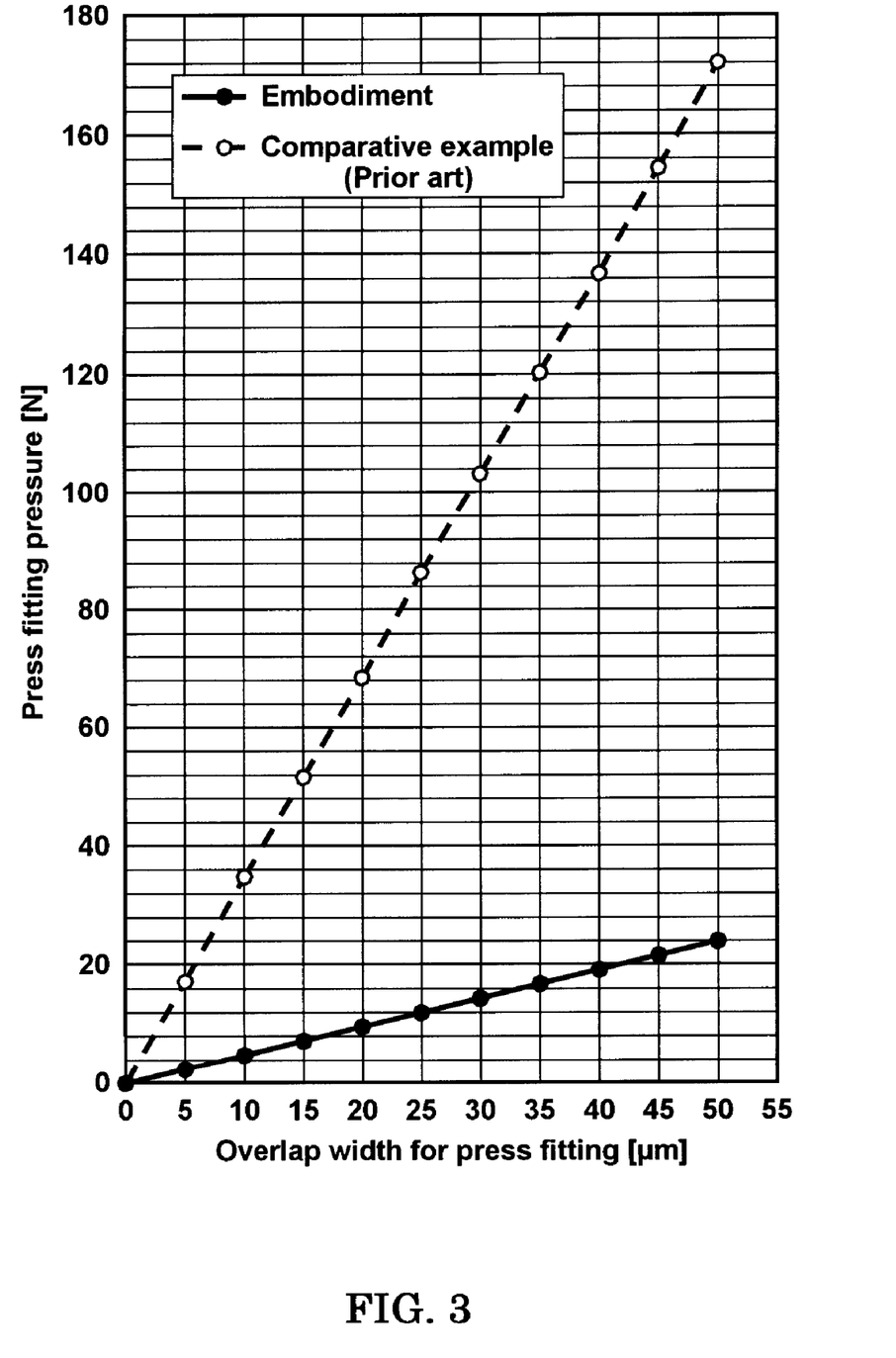
FIG. 3 is a graph showing characteristics of motors according to the first embodiment of the present invention and a comparative example according to the prior art.

FIG. 3 is a graph showing characteristics of motors according to the first embodiment of the present invention and a comparative example according to the prior art.

A motor having a suction ring according to the first embodiment of the present invention is a three-phase motor for driving a hard disc installed in a hard disc drive (hereinafter referred to as HDD). The motor is disposed in clean ambience of an HDD and rotates at least one hard disc mounted on a hub at a rotational speed of 5400 rpm.

In FIG. 1, a motor having a suction ring (hereinafter generically referred to as motor) 50 is essentially composed of a stator S and a rotor R. Descriptions are given to configurations of the stator S and the rotor R first.

The stator S is further composed of a motor base 5, a sleeve 10 that is fixed to the motor base 5, a core 6 and a coil 7 that is wound around the core 6.

The motor base 5 is formed through a cutting process of aluminum die-casting. A center hole 5b having a wall section 5a that rises upright with surrounding the center hole 5b is provided at the center of the motor base 5.

The sleeve 10 is formed in a cylindrical shape having a through hole 10a and fixed to the center hole 5b of the motor base 5 by adhering or press fitting.

Further, the sleeve 10 is made form a copper based sintered alloy material or a stainless steel material.

Furthermore, one end portion of the through hole 10a of the sleeve 10 is provided with a stepped section 10b having a plurality of steps for containing a thrust ring to be detailed.

The core 6 is formed in approximately an annular shape by laminating a plurality of thin plates made from a magnetic material such as silicon steel plate.

Further, a surface of the core 6 is treated by insulation coating through a process such as electropainting and powder coating.

As mentioned above, the motor 50 is driven by three-phase current, so that the core 6 is provided with nine protruded magnetic poles. Each protruded magnetic pole is wound up by the coil 7 corresponding to each phase.

Further, a terminal 7a of a winding wire of the coil 7 is soldered on a flexible printed circuit board (hereinafter referred to as FPC) 14 mounted on a bottom surface 5d of the motor base 5 by way of a through hole 5c.

Furthermore, the FPC 14 is provided with a soldering section not shown for soldering the terminal 7a of the coil 7 thereon and a land section not shown for electrically connecting the coil 7 to a driving circuit provided in an HDD side. A wiring pattern electrically connects between the soldering section and the land section.

On a top surface of the motor base 5, there is provided with a suction ring 11, which is made from iron, that is, a magnetic material and formed in an annular shape. The suction ring 11 is provided with a plurality of protruded sections in an outer circumferential section. Each protruded section is fixed to the motor base 5 by press fitting each protruded section into a wall section 5e that is provided on the motor base 5 in a circular wall shape. Further configurations of the suction ring 11 will be detailed later on.

On the other hand, the rotor R is composed of a shaft 13, a hub 2 that is formed in approximately a cup shape and a ring magnet 8 that is formed in an annular shape, wherein both of the shaft 13 and the ring magnet 8 are fixed to the hub 2.

The shaft 13 is made from a stainless steel material.

The hub 2 is provided with an outer circumferential wall section 2a, a flange 2b, which protrudes outward from the outer circumferential wall section 2a and is loaded with a hard disc 1, and a through hole 2c, wherein the hub 2 is made from a stainless steel material through a cutting process.

The ring magnet 8 is made from an Nd—Fe—B system material and its surface is nickel plated.

Further, an inner circumferential section of the ring magnet 8 is magnetized in 12 magnetic poles.

One end portion of the shaft 13 is fixed to the through hole 2c of the hub 2 by means of a process of press fitting or welding.

In addition, the ring magnet 8 is fixed on an inner circumferential surface of the outer circumferential wall section 2a of the hub 2.

As mentioned above, since the hub 2 is made from a stainless steel material, that is, a magnetic material, the hub 2, the core 6 and the ring magnet 8 result in constituting a magnetic circuit.

Further, the shaft 13 fixed to the rotor R is inserted into the through hole 10a of the sleeve 10 fixed to the stator S.

In this connection, the rotor R is sustained rotatable freely with respect to the stator S through a bearing when electric current from a driving circuit installed in an HDD side is supplied to each phase of the coil 7.

Succeedingly, the bearing is detailed.

The motor 50 is provided with radial dynamic pressure fluid bearings RB1 and RB2 and a thrust dynamic pressure fluid bearing SB.

The radial dynamic pressure fluid bearings RB1 and RB2 are constituted by an outer circumferential surface 13a of the shaft 13, an inner circumferential surface 10a1 of the through hole 10a of the sleeve 10 and lubricating fluid (hereinafter referred to as lubricant) 20 that is filled in a gap between the outer circumferential surface 13a of the shaft 13 and the inner circumferential surface 10a1 of the through hole 10a.

At least either one of the outer circumferential surface 13a and the inner circumferential surface 10a1 is formed with two groups of radial dynamic pressure grooves 16, which are allocated at individual positions in the axial direction. The radial dynamic pressure grooves 16 are such a groove as herringbone.

A taper section 23 is provided on a top end portion toward the hub 2 side of the through hole 10a of the sleeve 10, wherein a diameter of the taper section 23 increases in accordance with approaching a top end surface of the sleeve 10.

Further, a gap 22 is provided between the top end surface of the sleeve 10 and a bottom surface 2d of the hub 2.

An amount of the lubricant 20 to be filled is controlled such that a fluid level of the lubricant 20 positions in a middle of the taper section 23. Consequently, the taper section 23 is provided with a function of preventing the lubricant 20 from leaking out as a role of a so-called taper seal section.

Furthermore, providing the gap 22 between the sleeve 10 and the hub 2 prevents the lubricant 20 from leaking out or scattering more effectively.

By the radial dynamic pressure fluid bearings RB1 and RB2, the rotor R is sustained in the radial direction with respect to the stator S through dynamic pressure that is generated by the radial dynamic pressure grooves 16 in accordance with revolution of the rotor R.

On the other hand, the thrust dynamic pressure fluid bearing SB is constituted by a thrust ring 12 that is fixed to a bottom end portion of the shaft 13 and contained in the stepped section 10b of the sleeve 10, a counter plate 9 that is fixed to the stepped section 10b of the sleeve 10 and seals a bottom end section of the through hole 10a, and the lubricant 20 that is filled in gaps among each member.

At least either one of a top surface of the thrust ring 12 and a bottom end surface of the sleeve 10, which confronts with the top surface of the thrust ring 12, and at least either one of a bottom surface of the thrust ring 12 and a top surface of the counter plate 9, which confronts with the bottom surface of the thrust ring 12, are formed with thrust dynamic pressure grooves not shown such as herringbone.

By the thrust dynamic pressure fluid bearing SB, the rotor R is sustained in the thrust direction with respect to the stator S through dynamic pressure that is generated by the thrust dynamic pressure grooves in accordance with revolution of the rotor R.

With referring to FIG. 2, an actual configuration of the suction ring 11 and a method of installing the suction ring 11 to the motor base 5 are depicted next.

A shape and disposition of the suction ring 11 is decided such that a part of a top surface of the suction ring 11 confronts closely with a bottom surface 8a of the ring magnet 8 when the rotor R is mounted on the stator S. By this configuration, the rotor R is magnetically absorbed toward the stator S side.

In the first embodiment of the present invention, as shown in FIG. 2, the suction ring 11 is provided with six protruded sections 11a, which protrude outward in the radial direction in an outer circumferential section of the suction ring 11, at an equiangular interval.

More specifically, the suction ring 11 is a thin plate in an annular shape made from iron, wherein a thickness of the suction ring 11 is 0.4 mm, an outer diameter $\phi_1$ is 20 mm and an inner diameter $\phi_2$ is 16 mm.

Further, an outer diameter $\phi_3$ of each protruded section 11a is 21 mm and a tip width "d" in a circumferential direction of a tip portion of the protruded section 11a is 1.5 mm.

Furthermore, both ends of the tip portion of the protruded section 11a are gradually connected to an outer circumferential surface of the suction ring 11 itself by means of a curved section 11a1.

The suction ring 11 is fixed to the motor base 5 by press fitting these six protruded sections 11a1 into an inner circumferential surface of the wall section 5e of the motor base 5.

In the case of the suction ring 11 according to the first embodiment of the present invention, an overlap width for press fitting is designated to be 25 μm in diameter.

In this connection, it never occurs to the suction ring 11 that an overlap width disappears due to thermal expansion in the radial direction of the suction ring 11 and the motor base 5 and resulting in raising the suction ring 11.

As mentioned above, the suction ring 11 is provided with six protruded sections 11a and the tip width "d" of each protruded section 11a is designated to be 1.5 mm.

Further, a ratio of a length L1 in a circumferential direction of the protruded sections 11a to be press fitted, that is, a total length of the tip width "d" to a total circumferential length L of the suction ring 11 is minimized.

Accordingly, the suction ring 11 and the motor base 5 other than a section to be press fitted enable to be released from deformation.

More specifically, in the first embodiment of the present invention, the total circumferential length L of the suction ring 11 is "$\phi_3 \times \pi = 21$ mm$\times\pi \approx 66.0$ mm" and the length L1 of the tip width "d" of the protruded sections 11a is "1.5 mm$\times$6=9 mm", so that the ratio of L1 to L is "9/66.0=13.6 (%)". Consequently, press fitting pressure of the suction ring 11 according to the first embodiment becomes 11.7 N, which is approximately 13.6% of 86 N that is the press fitting pressure based upon the prior art, wherein a suction ring according to the prior art is provided with no protruded sections and press fitted to a motor base. As a result, deformation of the suction ring 11 or the motor base 5 does not become a problem.

A plurality of suction rings having an individual outer diameter is produced, and a relationship between an overlap width for press fitting and press fitting pressure is measured with respect to each suction ring. A result of measurement is shown in FIG. 3. In FIG. 3, a comparative example denotes a conventional motor according to the prior art, wherein the suction ring according to the prior art is provided with no protruded sections, and whole range of the outer circumference of the suction ring is press fitted into the motor base totally.

In FIG. 3, as mentioned above, the suction ring 11 according to the first embodiment of the present invention exhibits 11.7 N of press fitting pressure at 25 μm of the overlap width for press fitting.

Further, an overlap width for press fitting, which ensures preferable press fitting pressure of 20 N or less, is 40 μm or less.

Accordingly, the above-mentioned rising of the suction ring caused by thermal expansion never occurs. A range of overlap width, which does not deform a motor base other than a section to be press fitted, is desirable to be 25 to 40 μm.

In this connection, an upper limit of the overlap width is determined by the ratio of the length L1 of the protruded sections 11a in the circumferential direction to the total circumferential length L of the suction ring 11, that is, the ratio of L1 to L. Consequently, it is enough for determining an upper limit of an overlap width that an overlap width, which ensures press fitting pressure of 20 N or less, is designated to be an upper limit in accordance with the ratio of L1 to L.

As shown in FIG. 2, the suction ring 11 has a width "w", wherein "w=($\phi_1-\phi_2$)/2". The width "w" is wider than a width "wt" of a projected area T of the ring magnet 8, wherein the projected area T is a range of the ring magnet 8 that is projected on the surface of the suction ring 11. The suction ring 11 is formed in an annular shape so as to contain a whole range of the projected area T of the ring motor 8 on the surface of the suction ring 11 and mounted on the motor base 5. Consequently, no matter how the rotor R rotates, suction force caused by the ring magnet 8 is always uniform and constant.

Further, as mentioned above, the press fitting process of the suction ring 11 into the motor base 5 never deforms the suction ring 11 or the motor base 5 other than the section to be press fitted, so that the suction ring 11 is extremely accurate in perpendicularity and flatness with respect to an axis of rotation and accurately positioned.

Accordingly, the ring magnet 8 enables to be approached to the suction ring 11 furthermore, and resulting in enabling to minimizing dimensions of the motor 50.

In addition thereto, noise, vibration or an amount of movement of the rotor R in the axial direction is drastically reduced, so that the motor 50 higher in reliability enables to be realized.

Second Embodiment

A motor 50A according to a second embodiment of the present invention is identical to the motor 50 according to the first embodiment except for the stator S, the motor base 5 and the suction ring 11, so that details of the motor 50A other than a stator, a motor base and a suction ring are omitted.

Firstly, referring back to FIG. 1, the motor 50A according to the second embodiment is briefly explained. As shown in FIG. 1, the motor 50A is composed of a stator SA and the rotor R.

The stator SA is further composed of a motor base 5A, the sleeve 10, the core 6 and the coil 7.

Further, a suction ring 11A in an annular shape is fixed to the motor base 5A.

Figure 4:
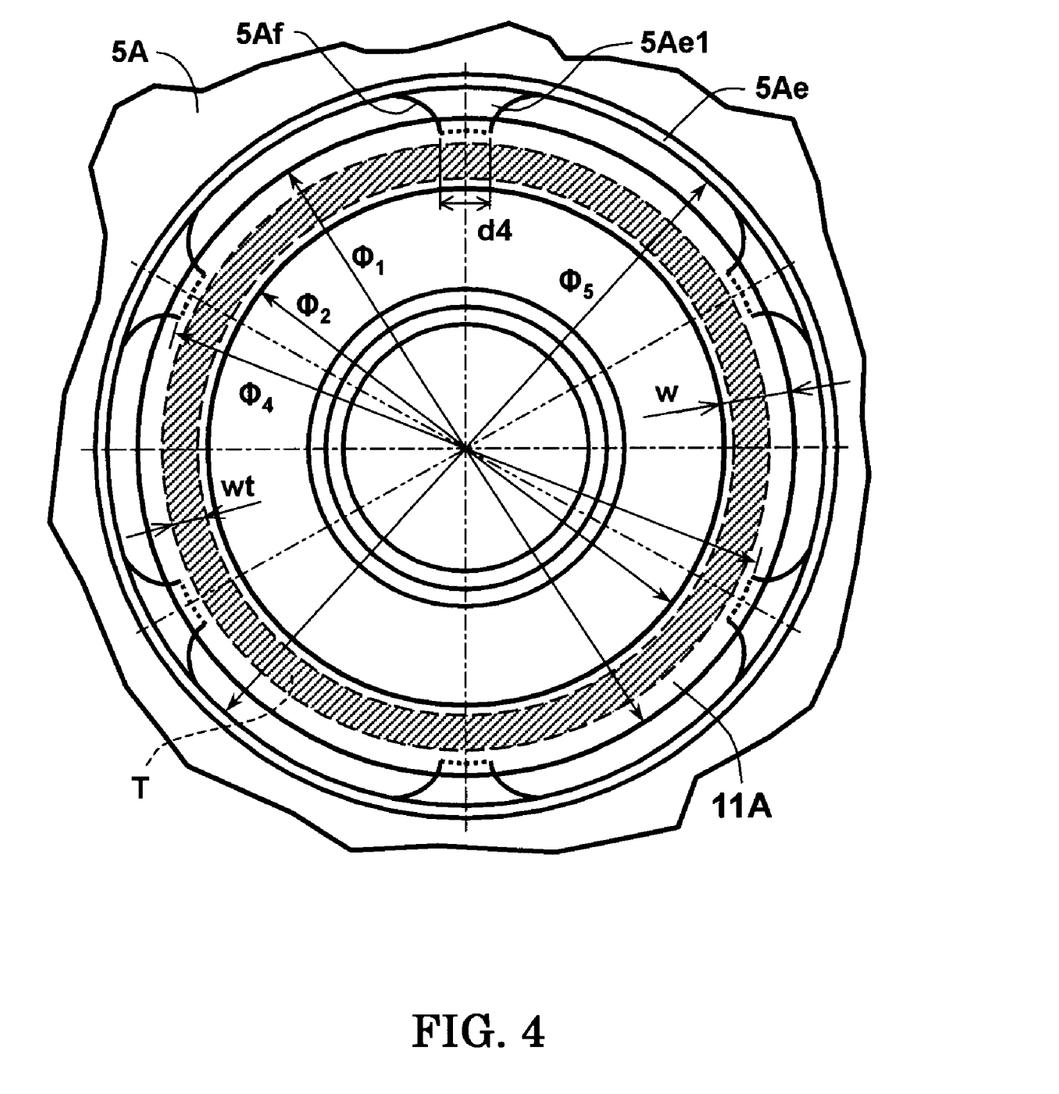
FIG. 4 is a plan view of a suction ring and a motor base related to the suction ring according to a second embodiment of the present invention.

In reference to FIG. 4, the motor base 5A and the suction ring 11A according to the second embodiment are depicted next.

FIG. 4 is a plan view of the suction ring 11A and the motor base 5A according to the second embodiment of the present invention showing a state of press fitting the suction ring 11A into the motor base 5A.

In the case of the suction ring 11 according to the first embodiment, the suction ring 11 is provided with the protruded sections 11a, which deform when the suction ring 11 is press fitted into the motor base 5.

On the contrary, in the case of the suction ring 11A according to the second embodiment, the suction ring 11A is not provided with any protruded sections. It shall be understood that such a protruded section, which deforms when press fitted, enables to be provided for the motor base 5A side.

For the purpose of easier understanding, a part equivalent to an overlap width for press fitting before press fitting is exhibited by a doted line in an exaggerated form in FIG. 4.

In addition thereto, major dimensions of the suction ring 11A are identical to those of the suction ring 11 except for protruded sections 11a, so that the same dimensions as those shown in FIG. 2 are denoted by the same reference sings.

As shown in FIG. 4, the motor base 5A is provided with six protruded sections 5Ae1, which protrude inward in the radial direction from an inner circumferential surface of a wall section 5Ae of the motor base 5A, at an equiangular interval.

More specifically, an inner diameter $\phi_4$ of the protruded sections 5Ae1 is designed so as to be "$\phi_1-\phi_4=25$ μm", wherein "$\phi_1=20$ mm" the same as that of the suction ring 11 according to the first embodiment.

Further, each tip width "d4" in a circumferential direction of a tip portion of the protruded sections 5Ae1 is designated to be 2.0 mm.

Furthermore, an inner diameter $\phi_5$ of the wall section 5Ae is designated to be 25 mm.

More, both ends of the tip portion of each protruded section 5Ae1 are gradually connected to the inner circumferential surface of the wall section 5Ae by means of a curved section 5Af.

The suction ring 11A is fixed to the motor base 5A by press fitting an outer circumference of the suction ring 11A into the six protruded sections 5Ae1 of the motor base 5A.

As mentioned above, the overlap width for press fitting is designated to be 25 μm in diameter.

Further, the motor base 5A is provided with six protruded sections 5Ae1 of which each tip width "d4" is designated to be 2.0 mm.

Furthermore, a ratio of a length L3 in a circumferential direction of the protruded sections 5Ae1 to a total circumferential length L2 of the suction ring 11A is minimized.

Accordingly, the suction ring 11A and the motor base 5A other than a section to be press fitted enable to be released from deformation.

More specifically, in the second embodiment of the present invention, the total circumferential length L2 of the suction ring 11A is "$\phi_1 \times \pi=20$ mm$\times\pi\approx62.8$ mm" and the length L3 of the protruded sections 5Ae1 is "2.0 mm$\times$6=12 mm", so that the ratio of L3 to L2 is "12/62.8=19.1 (%)".

In this connection, press fitting pressure of the suction ring 11A according to the second embodiment becomes 16.4 N, which is approximately 19.1% of 86 N that is the press fitting pressure based upon the prier art, wherein the suction ring according to the prior art is provided with no protruded sections, and whole range of the outer circumference of the suction ring is press fitted into the motor base totally.

Accordingly, deformation of the suction ring 11A or the motor base 5A does not become a problem.

In the second embodiment, the suction ring 11A has a width "w", wherein "w=$(\phi_1-\phi_2)/2$". The width "w" is wider than the width "wt" of the projected area T of the ring magnet 8, wherein the projected area T is a range of the ring magnet 8 that is projected on the surface of the suction ring 11A. The suction ring 11A is formed in an annular shape so as to contain the whole range of the projected area T of the ring motor 8 on the surface of the suction ring 11A and mounted on the motor base 5A. Consequently, no matter how the rotor R rotates, suction force caused by the ring magnet 8 is always uniform and constant.

Further, as mentioned above, the press fitting process of the suction ring 11A into the motor base 5A never deforms the suction ring 11A or the motor base 5A other than the section to be press fitted, so that the suction ring 11A is extremely accurate in perpendicularity and flatness with respect to an axis of rotation and accurately positioned.

Accordingly, the ring magnet 8 enables to be approached to the suction ring 11A furthermore, and resulting in enabling to minimizing dimensions of the motor 50A.

In addition thereto, noise, vibration or an amount of movement of the rotor R in the axial direction is drastically reduced, so that the motor higher in reliability enables to be realized.

As mentioned above, according to the present invention, the suction ring 11 or 11A is fixed to the motor base 5 or 5A by the press fitting process.

Further, a part to be deformed in response to the press fitting is formed as the protruded section 11a or 5Ae1.

Furthermore, the ratio of the length L1 or L3 in the circumferential direction of the protruded sections 11a or 5Ae1 to the total circumferential length L or L2 of the suction ring 11 or 11A is designated to be less than a ratio to be specified in accordance with a material used for the suction ring 11 or 11A.

Accordingly, the motor 50 or 50A, which is released from any deformation and further is high in reliability and excellent in characteristics of anti-vibration and impact resistant, enables to be realized.

In addition thereto, the motor 50 or 50A is less in noise and vibration and exhibits excellent rotational characteristics.

While the invention has been described above with reference to a specific embodiment thereof, it is apparent that many changes, modifications and variations in configuration, materials and the arrangement of equipment and devices can be made without departing form the invention concept disclosed herein.

For instance, it shall be understood that a number of protruded sections and a shape of the protruded sections are not limited to those as disclosed in the first and second embodiments. It enables to be designated accordingly in response to a ratio of a circumferential length of the protruded sections to an outer circumferential length of a suction ring as mentioned above.

Further, it shall be understood that the projected area T of the ring magnet 8 on the suction ring 11 or 11A is not limited to a specific position in a radial direction on the surface of the suction ring 11 or 11A, as long as a whole range of the projected area T is allocated on the surface of the suction ring 11 or 11A completely. In other words, the protruded sections 11*a* enable to be provided on any part of the suction ring 11 as long as the protruded sections 11*a* are not formed in a shape, which cuts in the projected area T partially when the protruded sections 11*a* are formed on the suction ring 11*a*.

Furthermore, it shall be understood that the protruded sections 11*a* are not limited to be provided on the outer circumference of the suction ring 11. They enable to be formed in an inner circumferential section of the suction ring 11 so as to protrude inward. In this case, a motor base to be press fitted with the protruded sections necessary to be provided with a wall section that protrudes inside the suction ring, and the protruded sections are press fitted into an outer circumferential surface of the wall section.

More, it shall be understood that the above-mentioned configuration is not limited to the case of providing protruded sections in the suction ring. The same is applied to a case of providing protruded wall sections in a motor base.

Moreover, the first and second embodiments of the present invention are described in a so-called shaft rotational type motor in which a shaft is fixed to a hub. However, the present invention is also applied for a motor in which a shaft is fixed to a motor base side is inserted into a sleeve fixed to a hub side, that is, a so-called shaft fixed type motor.

In addition thereto, it will be apparent to those skilled in the art that various modifications and variations could be made in the motor and the disc drive apparatus field in the present invention without departing from the scope of the invention.

What is claimed is:
1. A motor comprising:
a hub;
a ring magnet being fixed to the hub;
a rotor having the hub and the ring magnet;
a motor base;
a suction ring made from a magnetic material being fixed to the motor base; and
a stator having the motor base and the suction ring,
wherein the rotor is sustained rotatable freely with respect to the stator through a bearing composed of a sleeve and a shaft being inserted into the sleeve;
wherein the suction ring is provided with an outer circumferential section having a first outer diameter that is smaller than an inner diameter of a wall section of the motor base and a plurality of protruded sections that has a second outer diameter larger than the inner diameter of the wall section of the motor base and protrudes outward in a radial direction from the outer circumferential section of the suction ring;
wherein the plurality of protruded sections of the suction ring are press fitted into the wall section of the motor base and results in fixing the suction ring to the motor base; and
further wherein one surface of the suction ring is disposed so as to coincide with a bottom surface of the ring magnet covering a whole range of a projected area of the ring magnet that is projected on the surface of the suction ring.

2. The motor as claimed in claim 1, wherein a total length in the circumferential direction of respective tip width of the plurality of protruded sections is shorter than a total length in the circumferential direction of the outer circumferential section.

* * * * *